United States Patent [19]
Kurtz

[11] 3,995,247
[45] Nov. 30, 1976

[54] TRANSDUCERS EMPLOYING GAP-BRIDGING SHIM MEMBERS

[75] Inventor: Anthony D. Kurtz, Englewood, N.J.

[73] Assignee: Kulite Semiconductor Products, Inc., Ridgefield, N.J.

[22] Filed: Oct. 22, 1975

[21] Appl. No.: 624,605

[52] U.S. Cl. ................................ 338/43; 338/6
[51] Int. Cl.² ................... H01L 41/10; G01P 15/12
[58] Field of Search ................ 73/517 R, 516 R; 338/43, 46, 2, 6

[56] References Cited
UNITED STATES PATENTS

| | | | |
|---|---|---|---|
| 3,084,300 | 4/1963 | Sanchez | 338/2 |
| 3,102,420 | 9/1963 | Mason | 73/88.5 SD |
| 3,351,880 | 11/1967 | Wilner | 338/6 |
| 3,363,471 | 1/1968 | Lovelace et al. | 73/517 R |
| 3,636,774 | 1/1972 | Allison | 73/517 R |

*Primary Examiner*—James J. Gill
*Attorney, Agent, or Firm*—Arthur L. Plevy

[57] ABSTRACT

A transducer or accelerometer employs at least one slot or gap located in a seismic mass of a block-like configuration. The relative displacement of the opposing faces of the block, due to the slot, is monitored by means of a shim or similar metallic member, which spans the slot. Secured to the shim is a piezoresistive strain gage whose size and dimensions become relatively independent of the dimension of the slot, therefore enabling accurate and reliable strain detection without attendant temperature problems.

16 Claims, 2 Drawing Figures

TRANSDUCERS EMPLOYING GAP-BRIDGING SHIM MEMBERS

BACKGROUND OF INVENTION

This invention relates to strain gages in general and more particularly to a strain gage accelerometer configuration for detecting movements of an inertia member in a force transmitting environment.

Basically, an accelerometer measures acceleration or, more particularly, the force that is exerted when a body possessing inertia is accelerated. The inertia tends to resist the acceleration. The force according to Newton's law or the reaction is equal to the product of the mass and the acceleration.

Many different types of accelerometers exist in the prior art and basically can operate to measure acceleration by performing measurement on a mass which may be coupled to a spring assembly, or some other device, which due to its resiliency or movement, will compress or stretch for movement of the mass.

Various common types of accelerometers employ different types of transducing arrangements as well as different configurations.

Certain devices called angular strain gage types use two strain gages which form part of a bridge circuit and are mounted on a sensing beam. One can derive a sinusoidal or variable frequency output which is related to velocity or acceleration.

In other systems as the damped spring mass system, a seismic mass is the sensor. The mass is retained by a spring and damper in a housing. The mass can therefore move relative to the housing and when the housing is accelerated, the resultant displacement of the mass is measured.

Certain other transducers employ piezoelectric devices which use a crystal and housing in conjunction with a mass and may employ a spring and so on as an elastic member. The crystal produces an output proportional to the movement of the mass.

Another type of device is a stretched wire accelerometer where a mass is supported by two wires within a housing. If the housing is accelerated along the direction of the wire axis, tension of one wire increases while that of the other wire decreases. Strain pick off is in each wire and their sum is proportional to acceleration.

The piezoresistive transducer has also been employed for measuring strain in transducer configurations as indicated above. It has been known in the prior art that the piezoresistor is traditionally more sensitive than, for example, metal wire or foil type strain gages.

Certain prior art patents as U.S. Pat. No. 3,444,499 entitled STRAIN GAGE issued on May 13, 1969 to Endevco shows piezoresistive elements which are shaped into an hour glass configuration and thus, possess a narrow neck. This element is then mounted across a slot in a beam or mass. Due to the fact that the neck is narrow, the strain is concentrated and thus amplified. Further, the material used in the piezoresistive elements is a semiconductor material as silicon, which possesses a greater resistance per unit of strain than typical prior art devices.

Other patents as U.S. Pat. No. 3,363,471 entitled ACCELEROMETER show different slot configurations on seismic masses employing specially shaped piezoresistive elements having associated contacts therewith and positioned across a slot in a housing to measure displacement of the respective walls of the mass to provide outputs proportional to acceleration.

Other configurations of such piezoresistive strain gages can be had by referring to U.S. Pat. No. 3,351,880 entitled PIEZORESISTIVE TRANSDUCER issued on Nov. 7, 1967.

Generally, one can characterize the performance of an accelerometer by two quantities which are its output per acceleration ($g$) and its natural frequency. It is desireable to maximize both quantities in any given design; but because the greater the mass of the seismic structure, the greater the output per $g$ but the lower the natural frequency.

In order to eliminate the effect of mass, one frequently refers to a quantity designated as the figure of merit of the accelerometer system. The figure of merit is given by the product of the output per $g$ times the natural frequency squared. Since the output per $g$ is directly proportional to the mass and the natural frequency is proportional to the square root of the system's stiffness divided by the mass, the figure of merit will be independent of the mass.

In any event, due to the increasing demands of present technology, it is desireable to fabricate an accelerometer with high figures of merit, excellent thermal characteristics and enhanced ruggedness.

It is further desireable to employ such a device having an improved frequency response to enable one to therefore measure relatively high frequencies, small magnitude accelerations.

The problem in regard to certain prior art techniques resides in the fact that the strain gage is mounted or positioned directly across a narrow gap formed in a seismic mass. While this technique enabled one to obtain a high figure of merit, it presented a number of problems in attempting to bridge the gap directly with the strain sensitive elements. When the strain gage is placed directly across the gap, it acts as the only spring restoring member in the seismic system and its deflection is the maximum deflection that the system can accommodate. The strain in the sensor is given by $\Delta l$ divided by $l$; where $\Delta l$ is the deflection of the sensor and $l$ its effective length. Thus, for a given deflection, a narrow gap and a shorter effective length will result in a high figure of merit. However, the strain gage which is bonded at both ends has poor thermal characteristics since the center portion or strain responsive portion is not in contact with the mass material.

Furthermore, due to the narrow neck of the gage, one would experience breakage or fracture of the piezoresistive material for high shock loads.

In conjunction with these problems, one still could not obtain a significant improvement in the resonant frequency of the device due to the fact that the length and cross section of the gage, which has to bridge the slot or gap, are determined by criteria other than the most desireable spring constant.

Accordingly, to prevent buckling of the sensor, the sensor had to be as short and thick as possible. These characteristics are contrary to obtaining a sufficient resistance to make proper measurements as this resistance specifies that the sensor be as long and thin as possible. Thus, the electrical properties of the sensor are diametrically opposed to its mechanical properties.

Also as indicated, one experiences a problem in attempting to match the thermal expansion coefficient of the semiconductor sensor to the thermal expansion coefficient of the seismic mass. Since the sensor is usually fabricated from silicon, which has a low expansion coefficient, after the semiconductor is bonded across a gap, it will be placed in precompression and thus, in fact, be more susceptible to buckling.

It is therefore an object of this invention to provide an improved transducer arrangement for use in a slotted beam transducer or accelerometer device; which device possesses a high natural frequency, a high figure of merit and good thermal characteristics while exhibiting reliable operation.

DESCRIPTION OF PREFERRED EMBODIMENT

A transducer of the type employing a mass member wherein the mass member has a relatively narrow gap located on a surface thereof; the improvement in combination therewith of apparatus for bridging said gap, comprising a thin flexible shim of a length greater than the width of said gap and positioned across said gap and rigidly coupled at separate ends to said mass and at least one piezoresistive element of a substantially smaller cross section than said shim mounted on a surface of said shim.

DETAILED DESCRIPTION OF DRAWINGS

Figure 1:
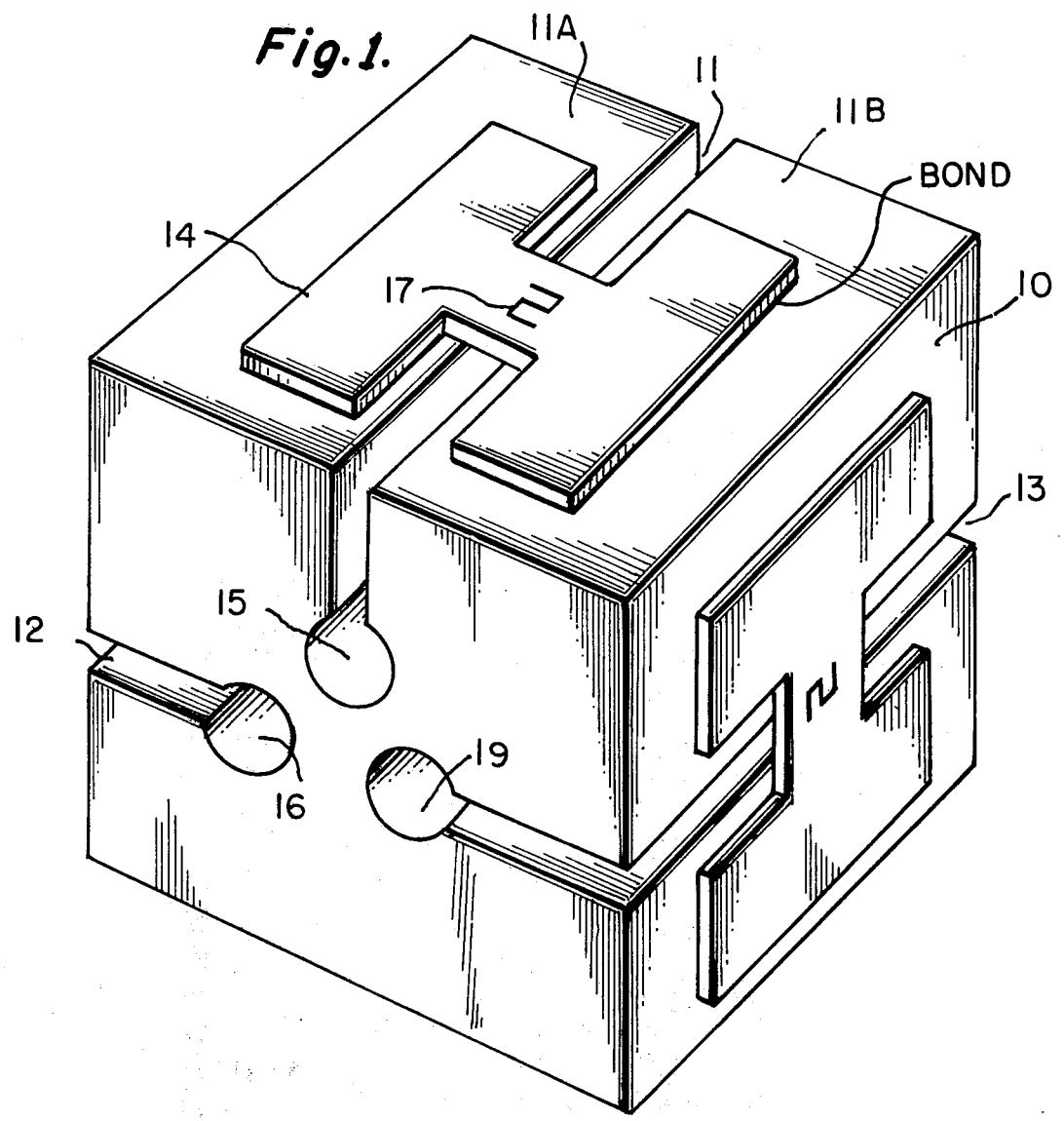
FIG. 1 is a perspective view of an accelerometer transducer according to this invention.

Referring to FIG. 1, there is shown a typical seismic mass structure 10. The structure 10 may be fabricated from a suitable material as a tungsten alloy, steel or Kovar. It essentially has three slots as 11, 12 and 13 formed in three surfaces as shown. The slots may be formed on X, Y, Z axes other than shown, mass 10 can be used as an accelerometer by placing gages across the slots, as will be explained.

Each slot as 11, for example, divides the material of the mass 10 into two wings or elements as 11A and 11B. These wings will pivot about the axis point 15 in response to accelerations or motions about an axis drawn through the point 15, which acts as a hinge point.

In a similar manner, the slots 12 and 13 form similar extensions which articulate about the hinges formed by the associated central apertures as 16 and 19.

The principal of operation of such an accelerometer as shown in FIG. 1 is well known in the art and basically, one is concerned with the strain produced across the respective slots 11, 12 and 13, which can be related by theoretical mathematics to produce an output related to acceleration.

In any event, as above indicated, the narrower the slot as 11, 12 and 13, the more sensitive the accelerometer in regard to measurements. As indicated, the problem of mounting a sensor across such a narrow gap becomes considerable in that the thermal response is bad and the fact that the sensor can rupture or break under high shock loads.

The block 10 may be fabricated as follows:

Basically, a solid block of material is drilled with three or more apertures at the locations determined by the centers of holes 15, 16 and 19. A diamond saw is then used to provide the slot as 11, 12 and 13. The width of the slot is determined by the width of the blade of the saw and slots between 0.003 to 0.01 inches can be conventionally formulated by means of these techniques.

A shim as 14 is now fabricated by an etching process. The shim 14 is fabricated from a relatively thin metallic material which is selected, as will be explained, to have a higher thermal expansion coefficient than the material which constitutes the seismic mass 10.

The shim 14 is then epoxied or welded across the gap as shown, by means of conventional techniques at an elevated temperature.

A piezoresistive element 17 is affixed to the shim and can be selected, as will be explained, to be relatively of any dimension desired. Due to the fact that the shim 14 is epoxied or welded at elevated temperatures across the slot 11 of the beam, it will be placed in tension because of the above noted difference in thermal expansion coefficients.

The piezoresistor 16 or strain gage is affixed to the beam by means of a glass or epoxy bond and can now be selected so that it has a relatively short effective length compared to the length of the shim 14 and essentially the same as the width of the slot 11.

In referring to FIG. 1, the force on each shim is given by the following proportionality:

$$F_{SHIM} \alpha M G$$

where:
M is the mass of the moving section
G is the acceleration.

The force on the shim is also proportional to:

$$F_{SHIM} \alpha \sigma A_{SHIM}$$

where:
$\sigma$ is the stress in the shim
$A_{SHIM}$ is the cross sectional area of the shim.
Also, the following equation is acceptable:

$$F_{SHIM} \alpha E \epsilon w t$$

where:
E is Young's modulus
$\epsilon$ is the strain in the shim
w is the width of the shim
t is the thickness of the shim
This can be rewritten as:

$$F_{SHIM} \alpha k \delta$$

where:
k is the stiffness, and
$\delta$ is the total linear deflection of the shim
since:
$\delta = \epsilon \times l$
where:
$l$ is the free length of the shim
then:
$K = wtE/l$ The natural frequency of such a system is proportional to: $\sqrt{K/M}$
thus: $fn \alpha \sqrt{wtE/lM}$
And the strain is given by:

$$\epsilon_s \alpha MG/Ewt$$

Thus, the dimensions of the shim control the natural frequency and the output of the system.

Moreover, the figure of merit, which is proportional to the product of: $fn^2\epsilon/G$ is only proportional to: $1/l$. Thus the requirement for a narrow slot.

Figure 2:
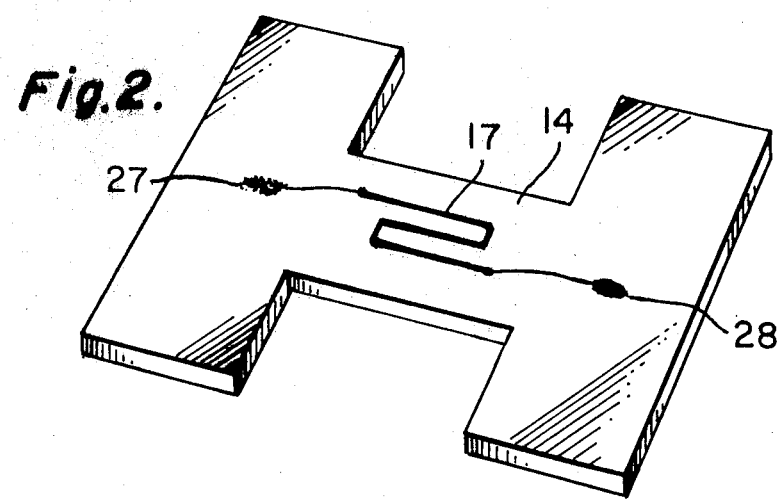
FIG. 2 is a perspective view of a shim strain gage configuration according to this invention.

An enlarged view of a shim as 14 is shown in FIG. 2 with a piezoresistive element 17 mounted at the central portion of the shim. Suitable terminals as 27 and 28 can also be positioned on the shim for connection to external circuitry.

As indicated, the shim basically is fabricated from a thin metallic foil such as steel, bronze, aluminum and so on. The metal etching techniques which are known to the art, enable one to produce, by the use of photographic processes, extremely small metal parts of practically any desired geometrical configuration.

It has been determined that by varying the thickness of the shim and the width, one can vary the natural frequency and the sensitivity while obtaining a higher figure merit than one could obtain by bridging the gap or slot 11 with solely a piezoresistive device.

It can be seen that the shim in FIG. 2 is of an I shaped configuration and that the end portions of the I are those which are epoxied or welded to the seismic mass.

The end portions of the shim are relatively large as compared to the central portion in order to assure that the shim, when emplaced across the gap or slot is firmly positioned on the seismic mass by bonding the relatively large end portions to the mass. This further assures that the central portion of the shim will primarily be responsive to the forces imposed thereon by the side walls of the mass adjacent the slot.

The central portion of the I is that portion which contains the gage 17 and therefore is positioned across the gap. By varying the width and thickness of this portion, one can alter or vary the range and natural frequency of the final transducer relatively independent of the dimension of the gage 17.

In order to accommodate accurate measurements, the dimensions of the piezoresistive element must be such as to achieve a reasonable resistance.

In any event, the geometrical configurations of the piezoresistance can be selected apart from the width of the shim or the slot as long as the gage dimensions are such to give it the proper resistance according to the equation:

$$R = \frac{pl}{tw}$$

where:
$R$ = resistance of gage
$p$ = resistivity of material, for instance 0.1 ohm-cm.
$l$ = length
$t$ = thickness
$w$ = width Thus, as can be seen, one can obtain a high resistance if the thickness and width of the semiconductor are made small.

It has been determined that the selection of a length of 0.008 inches with an effective thickness of between 0.0002 and 0.0004 and a width of 0.004 inches will give sufficient resistance in conjunction with the slot width as indicated above, to achieve accurate and relatively sensitive indications of acceleration.

The shim may have a thickness of between 0.001 to 0.002 or more inches and be as shown relatively of an I shape. The width of the central portion of the I or that surface which accommodates the gage 17 may be approximately 0.04 inches, while the length of the central portion of the shim is between 0.005 to 0.020 inches or large enough to approximately equal the slot width. The overall length of the I should be sufficient so that the ends can be epoxied or welded as shown in the figure across the gap.

The effective cross section of the shim can be selected to be twenty to four hundred times that of the gage 17.

Gages such as 17 can be fabricated in ultraminiature sizes and in various configurations by suitable processing techniques. Examples of some techniques for fabricating such gages can be had by referring to U.S. Pat. No. 3,868,719 entitled THIN RIBBON LIKE GLASS BACK TRANSDUCERS issued on Feb. 25, 1975 to Kurtz, et al and assigned to the same assignee as herein.

Such gages as above indicated, are extremely thin and fragile and could not be placed across a gap without extreme difficulty.

In any event, the shim 17, as above indicated, provides a rigid and reliable support for the gage, while further eliminating the thermal and shock problems due to the material used and the relative dimensions of the shim as compared to the gage. It becomes a relatively simple problem to select and vary the cross section of the shim to obtain a substantial improvement in the natural frequency of resonance and the figure of merit of the transducer. This therefore enables one to obtain improved and highly accurate acceleration measurements at frequencies not accommodated by the prior art.

The use of the metallic shim essentially frees the transducer from the form factor of the semiconductor gage 17. This form factor was a limiting characteristic of the prior art gages.

Essentially, in the prior art in order to obtain a reasonable resistance, one needed a reasonable length in order to maintain a relatively large thickness and width. This was necessary to assure that the semiconductor would not rupture or fracture when it was secured across the gap or slot or would not buckle during operation.

Thus, as above indicated, the units previously used employed hour glass shaped piezoresistors.

In the above configuration, the length can be made small and the thickness as well as the width can be selected at any reasonable value, as the semiconductor is completely and rigidly supported by the shim. The fact that the semiconductor does not have to be a length to span the gap, allows for much better thermal performance characteristics, as the metal shim is in good thermal contact with the mass 10 and the semiconductor or gage is in contact with the metal shim and not suspended in the vacuum across the gap as in the prior art.

One can vary the effective cross section of the shim to control the resonant frequency and the range of the transducer without operating on or varying the characteristics of the gage or change the rest of the seismic system. This, therefore is associated with increased economy and reliability as well as more accurate and controllable production techniques.

As indicated, the shim, when mounted across the gap, can be placed in tension and hence, the semiconductor when mounted on the shim, can also be placed in tension; thus eliminating the restrictive requirement that the piezoresistor be a Euler column.

Since the thickness of the semiconductor or gage is extremely small and of a relatively non-appreciable cross section compared to the shim, the semiconductor will not in any manner restrain the shim. Thus, the main flexible member, which will determine the relative movements of the wing elements as 11A and 11B of the mass 10, will be the shim.

A semiconductor, being mounted on the shim by means of an epoxy or glass bond, is responsive to the movement of the shim as determined by the seismic mass and hence provides an output proportional to the strain provided across the slot.

In summation, there has been disclosed a unique transducer configuration which employs a thin, flexible shim mounted across a narrow gap and secured in that position by means of a weld or an epoxy bond. A piezoresistor of a small cross section is then positioned on the shim, which supports the same and assures good thermal response and a high frequency of operation, while further assuring that breakage or fracturing of the semiconductor cannot easily occur, due to the support provided by the elastic shim thin metallic member.

The technique allows one to use a minimum number of machine seismic systems as for example, the block 10 shown in FIG. 1 and by varying the width and thickness of the shim or shims, one can vary the range a few orders of magnitude.

Also, due to the fact that one uses a very small gage, this can be relatively uniform and utilized as a single design relatively independent of the range or required resonant frequency to obtain a further benefit in the manufacturing process.

While the above described system employed an accelerometer having three slots, it is also noted that various other slot configuration transducers could be employed as well and with the use of shims, one could derive the above described benefits in regard to operation.

I claim:
1. In a transducer of the type employing a mass member having at least one relatively narrow gap formed in a surface thereof, the improvement in combination therewith of apparatus for bridging said gap, comprising:
   a. a thin, flexible shim of a length greater than the width of said gap positioned across said gap and rigidly coupled at separate ends to said mass, and
   b. at least one serpentine piezoresistive element of a substantially smaller cross section that said shim mounted on a surface of said shim, across said gap the length of said piezoresistive element being relatively equal to the length of said relatively narrow gap, with said piezoresistive element as mounted being positioned solely above said gap on said shim.

2. The transducer according to claim 1 wherein said shim is fabricated from a metal.

3. The transducer according to claim 1 wherein said shim is of an I shaped configuration with the end portions of said I secured to opposite sides of said mass and said central portion of said I directed across said gap.

4. The transducer according to claim 3 wherein said piezoresistive element is mounted on said central portion of said I.

5. The transducer according to claim 1 wherein said thin, flexible shim has a higher temperature expansion coefficient than said mass.

6. The transducer according to claim 1 wherein the width of said narrow gap is between 0.003 to 0.015 inches.

7. A transducer structure, comprising:
   a. a mass structure having a narrow slot located on a given surface providing a pair of flexure members for rotation in opposite directions with respect to said slot,
   b. a thin, flexible shim of a length greater than the width of said slot and positioned across said slot with repective ends of said shim coupled to a separate one of said flexure members, whereby a central portion of said shim is directed across said slot,
   c. at least one serpentine piezoresistive element mounted on said shim and located relatively in said central portion, said piezoresistive element being of a substantially smaller cross section than said shim, and of a length relatively equal to the length of said narrow slot, whereby said element is positioned solely above said gap.

8. The transducer according to claim 7 wherein said thin, flexible shim is of an I shaped surface configuration with each end of said I coupled to a respective one of said flexure members, whereby said central portion of said I bridges said slot.

9. The transducer according to claim 7 wherein said shim as coupled to said flexure members, is placed in tension across said slot.

10. The transducer according to claim 7 wherein said shim is of a cross section which is two hundred times greater than the cross section of said piezoresistive element.

11. A strain gage particularly adapted for positioning across a gap in a seismic mass as used in an accelerometer, comprising:
   a. a thin, flexible shim of a generally I-shaped surface configuration, each of said end sections of said I adapted to be coupled to separate surfaces of said mass with said central portion of said I bridging said gap, and
   b. at least one serpentine piezoresistive element mounted on said shim relatively within said central portion thereof and of a substantially smaller cross sectional area than said shim, the length of said piezoresistive element being relatively equal to the length of said gap, whereby said element is positioned on said shim solely above said gap.

12. The strain gage according to claim 11 wherein said shim is fabricated from a heat conductive metal to serve as a heat sink for said piezoresistive element.

13. The strain gage according to claim 11 wherein said cross sectional area of said shim is two hundred times greater than that of said piezoresistive element.

14. The strain gage according to claim 11 wherein the width of said central portion is between 0.002 to 0.015 inches.

15. The strain gage according to claim 11 wherein said piezoresistive element is coupled to said shim by means of a glass bond.

16. An accelerometer apparatus comprising in combination:
   a. a seismic mass member having a first slot on a first surface thereof, a second slot relatively transverse to said first slot and located on a second surface and a third slot on a third surface, said third slot being relatively transverse to said first slot,
   b. first, second and third thin, flexible shim members, each having a central portion relatively equal to the width of said slots and first and second end portions relatively transverse to said central portion, to form a I shaped member, c. at least first, second and third separate serpentine piezoresistors, each one associated with each of said shims, located within said central portion of said associated shims, and each of a length relatively equal to the length of said respective slot, d. first means for positioning said first shim across said first slot with said central portion bridging said slot and said end portions bonded to respective sides of said mass, e. second means for positioning said second shim across said second slot with said central portion bridging said slot and said end portions bonded to respective sides of said mass, f. third means for positioning said third shim across said third slot with said central portion bridging said slot and said end portions bonded to respective sides of said mass.

* * * * *